(12) United States Patent
Somasundaram et al.

(10) Patent No.: US 12,154,308 B1
(45) Date of Patent: Nov. 26, 2024

(54) SYSTEM AND METHOD FOR HOME FAÇADE FEATURES IN A GEOGRAPHIC REGION

(71) Applicants: Sivakumaran Somasundaram, Glasgow (GB); Ali Salman, Glasgow (GB); Avnish Kumar, Glasgow (GB); Ian Michael Scott, Aberdeen (GB)

(72) Inventors: Sivakumaran Somasundaram, Glasgow (GB); Ali Salman, Glasgow (GB); Avnish Kumar, Glasgow (GB); Ian Michael Scott, Aberdeen (GB)

( * ) Notice: Subject to any disclaimer, the term of this patent is extended or adjusted under 35 U.S.C. 154(b) by 0 days.

(21) Appl. No.: 18/369,091

(22) Filed: Sep. 15, 2023

Related U.S. Application Data

(63) Continuation of application No. 18/369,083, filed on Sep. 15, 2023.

(51) Int. Cl.
| | |
|---|---|
| *G06K 9/00* | (2022.01) |
| *G06F 16/29* | (2019.01) |
| *G06T 7/13* | (2017.01) |
| *G06T 7/62* | (2017.01) |
| *G06V 10/25* | (2022.01) |
| *G06V 10/26* | (2022.01) |
| *G06V 10/44* | (2022.01) |
| *G06V 10/70* | (2022.01) |
| *G06V 20/10* | (2022.01) |

(52) U.S. Cl.
CPC ............. *G06V 10/44* (2022.01); *G06F 16/29* (2019.01); *G06T 7/13* (2017.01); *G06T 7/62* (2017.01); *G06V 10/25* (2022.01); *G06V 10/267* (2022.01); *G06V 10/273* (2022.01); *G06V 10/70* (2022.01); *G06V 20/176* (2022.01); *G06T 2207/20081* (2013.01); *G06T 2207/20132* (2013.01); *G06T 2207/20164* (2013.01); *G06T 2207/30242* (2013.01)

(58) Field of Classification Search
None
See application file for complete search history.

(56) References Cited

U.S. PATENT DOCUMENTS 11,205,236 B1 * 12/2021 Smith ................... G06N 3/08
2013/0182108 A1 * 7/2013 Meadow ................ G06T 17/05
348/143

* cited by examiner

*Primary Examiner* — Sj Park
(74) *Attorney, Agent, or Firm* — James A. Italia; Italia IP

(57) ABSTRACT

A method including receiving a first set of one or more street level images of houses into a Machine Learned Model trained with a second set of street level images with one or more exterior features of the houses labeled, identifying the one or more exterior features in the first set of street level images by way of the Machine Learned Model, and quantifying and outputting the counts and/or two-dimensional areas for each of the identified exterior features in the first set of one or more street level images is described. Non-transitory, computer-readable storage media having instructions for executing the method steps by one or more processors as well as computer or computer systems capable of performing the method steps are also described.

15 Claims, 18 Drawing Sheets
(17 of 18 Drawing Sheet(s) Filed in Color)

```
{
    "_id": "50642d35efe074a4ae330407b4cd331fa5880d5cfc68ae3743d4197b"
    "Address": "6801 W AURORA DR, GLENDALE, AZ",
    "Zip Code": 85308,
    "lat": 33.6779892,
    "lng": -112.2053824,
    "Date of Image Acquisition": "2021-10",
    "image_url": "6801_W_AURORA_DR_GLENDALE_AZ.jpg",
    "mask_image_url": 6801_W_AURORA_DR_GLENDALE_AZ_mask.jpg",
    "door_count": 1,
    "window_count": 3,
    "garage_door_count": 1,
    "opened_garage_count": 0,
    "horizontal_facade_count": 0,
    "vertical_facade_count": 0,
    "stone_facade_count": 0,
    "brick_facade_count": 0,
    "stucco_facade_count": 1,
    "shakes_facade_count": 0,
    "roof_count": 1,
    "door_area_m2": 0.565619043,
    "window_area_m2": 0.803287814,
    "garage_door_area_m2": 11.01379927,
    "opened_garage_area_m2": 0,
    "horizontal_facade_area_m2": 0,
    "vertical_facade_area_m2": 0,
    "stone_facade_area_m2": 0,
    "brick_facade_area_m2": 0,
    "stucco_facade_area_m2": 4.034930461,
    "shakes_facade_area_m2": 0
}
```

FIG. 16

SYSTEM AND METHOD FOR HOME FAÇADE FEATURES IN A GEOGRAPHIC REGION

CROSS-REFERENCE TO RELATED APPLICATION

This application is a continuation of U.S. Non-Provisional Utility application Ser. No. 18/369,083 filed Sep. 15, 2023, the contents of which are incorporated by this reference.

FIELD

The present disclosure is directed to the field of image processing for detecting and analyzing exterior features of houses.

SUMMARY

In general, in a first aspect, the disclosure features a method. The method includes receiving a first set of one or more street level images of houses by a Machine Learned Model including a Convolutional Neural Network trained with a second set of street level images with one or more exterior features of the houses labeled, identifying the one or more exterior features in the first set of street level images by way of the Machine Learned Model, and quantifying and outputting the counts of each of the identified exterior features in the first set of one or more street level images. The method can further include converting pixels of the identified exterior features into area dimensions, and quantifying and outputting a two-dimensional area for each of the identified exterior features in the first set of one or more street level images. The method can further include receiving one or more raw street level images of individual houses from a first storage, cropping each of the one or more raw street level images to remove portions of adjacent houses in the images to produce cropped images, and storing in a second storage the cropped images as the first set of one or more street level images of houses for input into the Machine Learned Model. The method can additionally include receiving a geographic area of interest, storing the geographic area of interest in a third storage, retrieving addresses of houses within the geographic area of interest from a fourth storage, and storing in the first storage one or more raw street level images of individual houses corresponding to the retrieved addresses.

In general, in a second aspect, the disclosure features a method. The method includes receiving as input a geographic area of interest and home exterior features of interest on a graphical user interface, storing the geographic area of interest, retrieving addresses of all houses within the geographic area of interest, retrieving and storing raw street level images of houses for each of the retrieved addresses, cropping the raw street level images to remove portions of adjacent houses in the images, storing the cropped images, providing the stored cropped images to a Machine Learned Model trained with a training set of street level images of houses with one or more exterior features labeled, identifying the home exterior features of interest in the cropped images by way of the Machine Learned Model, processing output of the Machine Learned Model by converting pixels of the identified exterior features into area dimensions, quantifying a number of identified exterior features and their respective two-dimensional areas in one or more of the cropped images, and sending as output counts of the home exterior features of interest within the geographical area of interest and their respective two-dimensional areas on the graphical user interface.

In general, in a third aspect, the disclosure features a method. The method includes inputting a geographical area of interest by way of a graphical user interface, where the inputting determines the content of an input set of street level images of houses within the geographical area of interest for input into a Machine Learned Model trained with a training set of images of houses with exterior features labeled, and receiving as output from the Machine Learned Model determinations of one or more of the exterior features of the houses in the input set of street level images, the determinations including quantifications of the number of exterior features and of their two-dimensional areas. The inputting and receiving can be performed on a first computer, and the Machine Learned Model can be stored on one or more non-transitory, computer-readable memories of at least a second computer.

In general, in a fourth aspect, the disclosure features a method. The method includes receiving input of a geographical area of interest on a graphical user interface, and retrieving home addresses within the geographical area of interest from a storage of home addresses.

In general, in a fifth aspect, the disclosure features a method. The method includes providing a street address and the aerial outline of a house from a mapping application, converting the street address to a geographic location including a latitude and longitude, retrieving a street level image of the house from the geographic location, identifying corners of the house in the street level image by determining the angular extent of the house from the nearest point on the street from the aerial outline and translating distance and angles from the determining step to pixel values in the street level image, calculating portions of the street level image in excess of pixel values representing the house, and cropping the portions from the street level image, thereby removing neighboring houses from the image.

In general, in a sixth aspect, the disclosure features a method. The method includes receiving output from a Machine Learned Model trained to identify exterior features from houses in a geographic area of interest, the output including one or more exterior features identified, processing the output by converting pixel coordinates in the exterior features to distance measurement units, determining the area of the exterior features from the distance measurements, quantifying the number of exterior features identified, and formatting and standardizing the processed output for input into a geographic information system application.

Additional aspects of the disclosure include one or more non-transitory, computer-readable storage media having instructions for execution by the one or more processors, the instructions programmed to cause the one or more processors to perform the steps of the methods of the first aspect, second aspect, third aspect, fourth aspect, fifth aspect, and/or the sixth aspect.

Additional aspects of the disclosure include a computer or computer system including one or more processors designed to execute instructions, one or more non-transitory, computer-readable memories storing program instructions for execution by the one or more processors, the instructions programmed to cause the one or more processors to perform the steps of the methods of the first aspect, second aspect, third aspect, fourth aspect, fifth aspect, and/or the sixth aspect.

Features of the methods, non-transitory, computer-readable storage media, and computer or computer systems can include the following. The geographic area of interest can be inputted on a graphical user interface as a boundary on a map or as one or more of street, block, neighborhood, town, city, county, state, metropolitan statistical area (MSA), core-based statistical area (CBSA), five-digit ZIP Code, nine-digit ZIP Code, geographic coordinates (latitude and longitude), and tax parcel number. The output can include text representing characteristics of each image in the one or more street level images, the text having information including a unique alphanumeric identifier, a street address, a geographic location, a date of image acquisition, an image URL, counts of individual home exterior features identified in the image, and calculated areas of individual home exterior features of the image. The text can be formatted and standardized for input into a geographic information system application. The counts and/or two-dimensional areas for each of the identified exterior features in the image or images can be outputted as a bar chart, a heat map, and/or a pie chart representing a percentage of total counts or total area. The identified exterior features can be chosen from windows, doors, garage doors, roofs, horizontal façades, vertical façades, stucco façades, brick façades, shakes façades, and stone façades. The identified exterior features can be identified as requiring repair or replacement. The trained Machine Learned Model can be a Convolutional Neural Network.

It should be understood that the methods, non-transitory, computer-readable storage media, and computer or computer systems are not to be considered limitations on the invention defined by the claims. The featured methods, non-transitory, computer-readable storage media, and computer or computer systems can be implemented in one or more ways using one or more features depicted in the drawings, described in the detailed description, and set forth in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate certain aspects and principles of the implementations set forth, and should not be construed as limiting.

FIG. 16 is an example of output data in a standardized format for consumption by geographic information systems.

DETAILED DESCRIPTION

Figure 1:
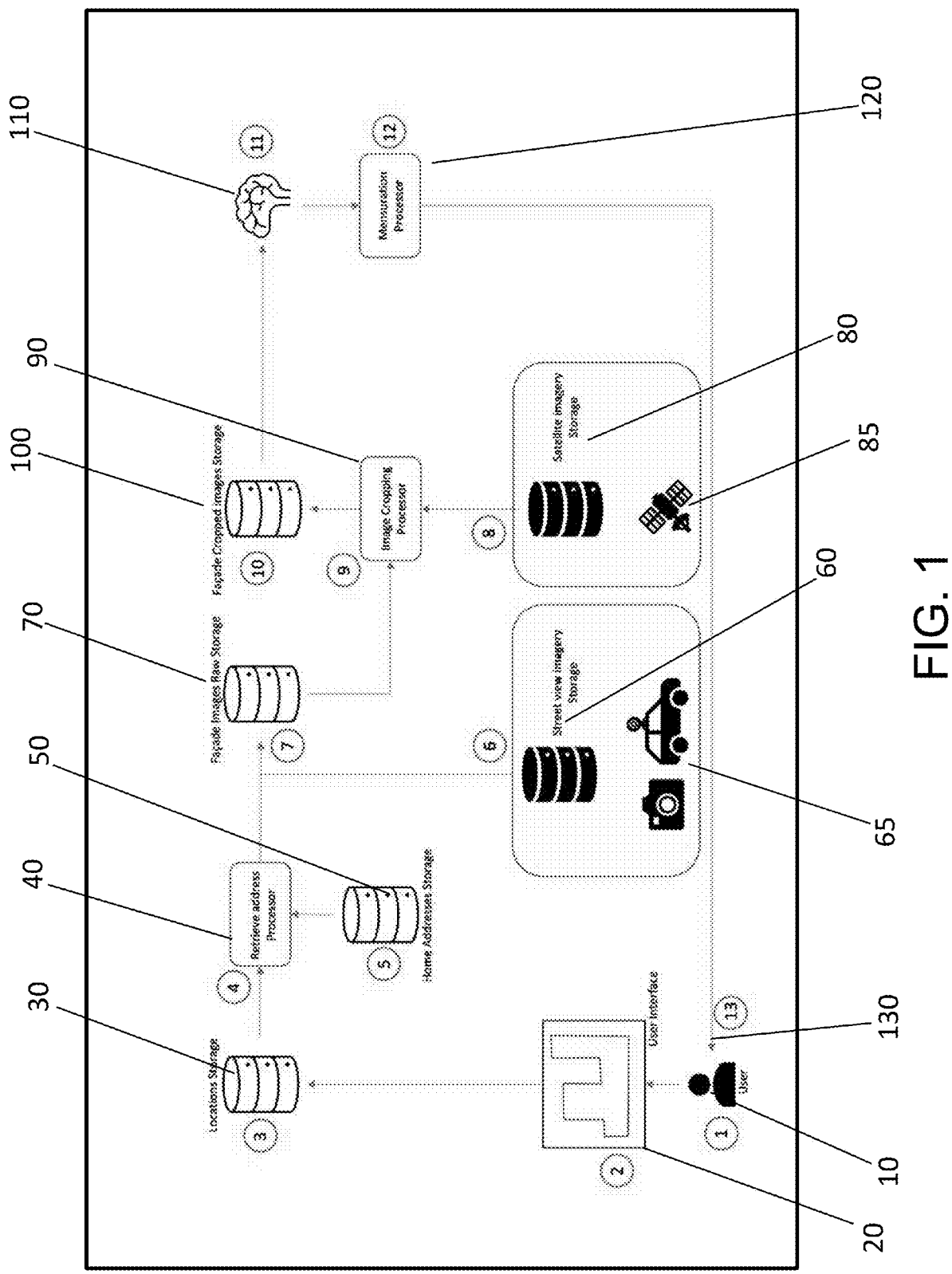
FIG. 1 is a diagram of workflow and data flow of a system and method of home exterior feature detection and analysis according to one implementation.

Reference will now be made in detail to various illustrative implementations. It is to be understood that the following discussion of the implementations is not intended to be limiting.

The disclosure pertains to the use of imagery captured by non-invasive remote sensing platforms. This covers the entire spectrum of aerial and terrestrial remote sensing platforms including but not limited to drones, aircraft, satellites, 360 degrees panoramic platforms, human centric cameras, and crowdsourcing. It also covers all types of images such as monochromatic, panchromatic, multispectral, hyperspectral and radar imagery. Remote imagery from aerial platforms is captured almost exclusively in broad daylight and these images capture fine detail of the features related to the outline of the house. Similarly, street view imagery of streets and houses are invariably captured in daylight and with sufficient detail to visually scan these images to analyze façade and other home exterior features.

In the field of Machine Learning, Convolutional Neural Networks are an excellent function approximator for inferring features in an image. This is achieved by demarcating features with boundaries in a large set of images to facilitate the neural network to infer the correlation between the features and the corresponding labels. Once the neural network has learned the relation between the features and labels, it is said to be trained. Now using the trained neural network, features in a hitherto unseen image can be automatically detected.

Using the combination of the above two capabilities then, the disclosure provides an automatic method of detecting the various exterior features of a house using images captured from above and from the street. This is possible because the level of detail inherently captured in these images are of sufficient resolution to discern these features as well as measure their count. Thus, with the simple act of expressing house addresses, the trained neural network can identify exterior features such as doors, windows, garage doors, façades, and roof. Furthermore, the network can also classify material conditions such as broken windows, dented garage doors, faded paint on façades, or any other material condition of home exterior features requiring repair or replacement. Processing of output of the neural network can also quantify the geometric area of features identified, such as the total square meters of garage door in a home or across homes in a geographic area of interest, and/or quantify a count of the exterior features.

The disclosure provides several computer-implemented methods related to home exterior feature detection and analysis. The methods can be performed as a series of steps programmed as computer-executable instructions implemented by one or more processors. The disclosure also provides one or more non-transitory, computer-readable storage media which store the computer-executable instructions, and one or more computer or computer system including one or more processors designed to execute the instructions, and one or more non-transitory, computer-readable memories storing the instructions.

The disclosure includes a computer-implemented method for obtaining addresses of all houses in a geographic boundary of interest. The method includes saving a user's geographic area of interest in a storage system through a software user interface, and retrieving all home addresses that lie within that boundary from a custom, proprietary database.

The disclosure also includes a computer-implemented method of retrieving an accurate, complete street view image of a home exterior using the address and the aerial outline of the house from a mapping application. The method includes converting the address to a location on the Earth's geographic coordinate system (latitude/longitude), using that location to retrieve the image of the house for that address, using a custom, bespoke algorithm, and a mapping application to identify the exact corners of the house facing the street from where the image was taken, and calculating the exact portion of the image to be cropped so that ambiguities in measurements are minimized.

The disclosure also includes a computer-implemented method of detecting and demarcating features of different types in the image of a home exterior. The method includes receiving image data containing the exterior of a house or houses in pixel values and labels, tuning a Machine Learning Algorithm such as an artificial neural network such that an approximate function is identified to establish the relation between the features within a boundary of the image and its corresponding label, receiving image data corresponding to a house at a given address or houses within a defined geographic area whose exterior features need to be identified and measured, processing the image data to identify exterior features and determine the boundaries in image pixel coordinates of such features (such as façade wall, roof, windows, doors, garage doors), and assigning a probabilistic score to the degree of confidence in demarcating boundaries around each area of a feature of the home exterior.

The disclosure also includes a computer-implemented method of detecting features related to the exteriors of houses in images taken from a street level perspective. The method includes receiving, by a Machine Learning Algorithm such as a Convolutional Neural Network training images (e.g., monochrome, RGB, panchromatic, multispectral, hyperspectral) and outline labels (e.g., doors, windows, garage doors, façade styles, walkways, roof, floors), thus creating a classifier (e.g., Convolutional Neural Network) configured to identify and demarcate features of interest by dividing the image into regions of multiple proposals.

The disclosure also includes a computer-implemented method that converts image pixels values to commensurate mensuration units (e.g., square meters, counts), and prepares the data for consumption. The method includes processing the boundary in image pixel coordinates and converting the coordinates to terrestrial distance measurement units as meters, creating a schema of all information related to the house for ready consumption by a processor, distinguished by a globally unique identifier, and storing the data in a standardised format that facilitates easy consumption in different formats and visualisations, such as input into a geographic information system.

FIG. 1 depicts a system and method for home exterior feature detection and analysis which shows the overall workflow and data flow thereof according to one implementation. As can be appreciated, the system and method represented by the flow chart diagram of FIG. 1 can be modified to remove or add one or more steps or components, change the order of steps or components, or substitute or exchange one or more steps or components in a manner that achieves the same effective result. Further, it will be readily apparent that some of the icons in FIG. 1 may refer to physical components, while others refer to process steps, and still others represent a process step performed by or on a physical component. Process steps represented as blocks in the flowchart diagram in FIG. 1, and combinations of blocks in the flowchart diagrams, can be implemented or supported by computer program instructions. These computer program instructions may be provided to a processor of a general-purpose computer, special purpose computer, or other programmable data processing device or combination of devices, such that the instructions, which execute via the processor or processors of the computer or other programmable data processing device(s), create means for implementing the functions/acts specified in the flowchart blocks. As such, the processes depicted herein can be performed as a series of steps which are implemented as computer-readable code, computer-readable instructions, computer-executable instructions, or "software" or "applications" performed by one or more processor. Such software can be loaded onto a memory of computer, computing device, or system or combination thereof, as an application or program (or multiple applications or programs) capable of performing one or more steps of the process. As can be appreciated, different steps or groups of steps of the process of FIG. 1 can be performed by different computers or computing devices, or some or all can be performed by a single computer or computing device.

At step 1, the user 10 chooses a location or geographic area of interest where they want to gather information about home exteriors. This could be a geographic area of any size and of any curvilinear and/or rectilinear shape. The geographic area can be chosen from street, block, neighborhood, town, city, county, state, metropolitan statistical area (MSA), core-based statistical area (CBSA), five-digit ZIP Code, nine-digit ZIP Code (ZIP+4), geographic coordinates (latitude and longitude), and tax parcel number. In other implementations, the geographic area is custom-defined by the user, such that the user captures a desired geographic area on a map such as by creating an outline surrounding the desired area. At step 2, the user is able to input this information through a user interface 20 provided by a custom software application. This application allows a user to create, edit or delete areas and locations. The user interface 20 provides an input screen which allows the user to define a geographic area or location of interest which they want to analyze for specific home exterior features. The input screen can be a map or image (e.g., aerial, satellite) that allows a user to zoom in and out of or move through a geographic area either through control of a cursor or through input of data associated with the location. The map or image can be provided from a service such as Google Maps, Bing Maps, or other internet service map/image provider.

Figure 2:
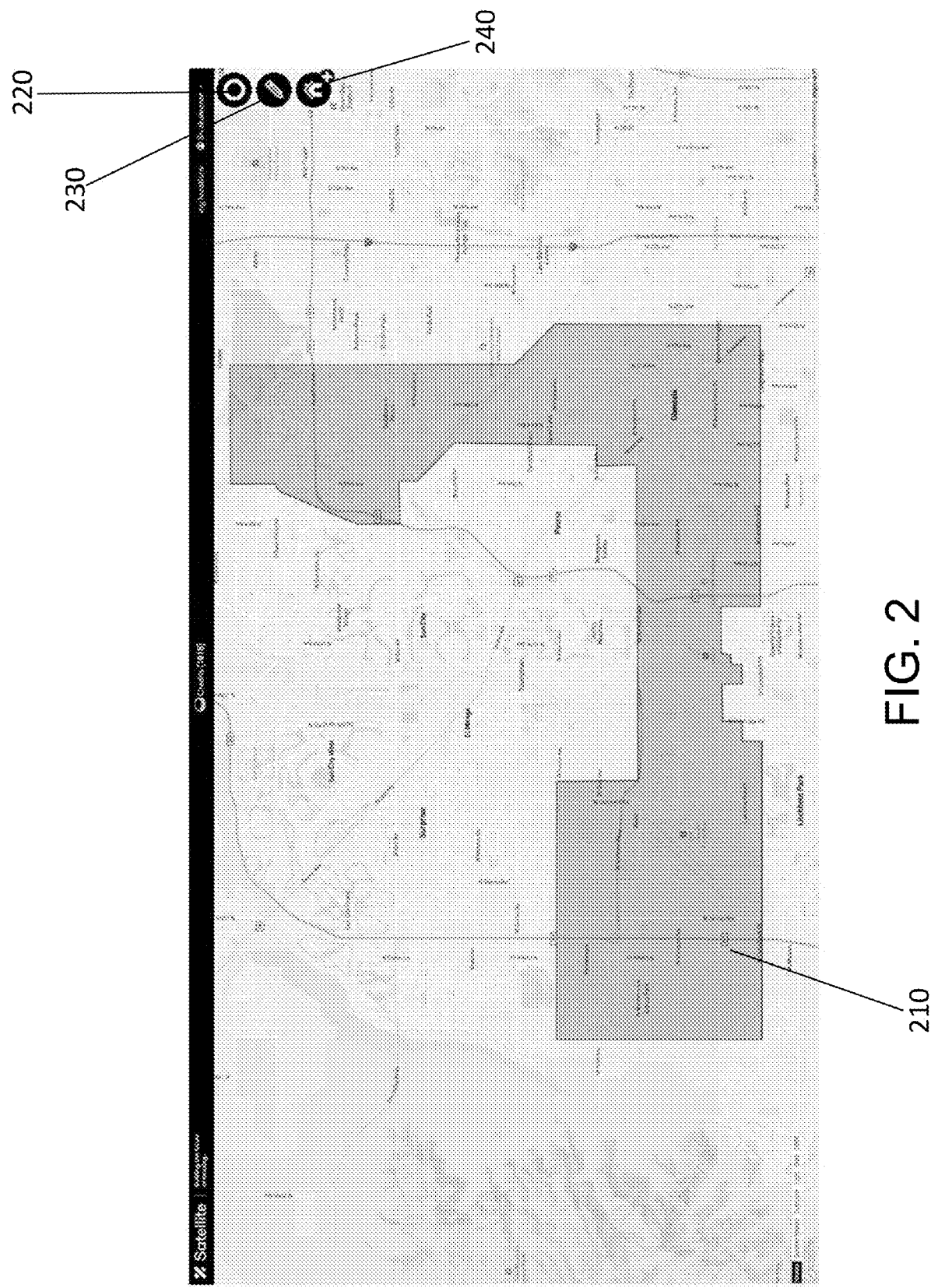
FIG. 2 is a screenshot of a user interface for drawing and saving boundaries surrounding a geographic area of interest according to one implementation.

FIG. 2 depicts a screenshot of an actual area 210 drawn on a user interface (20 in FIG. 1) of the application which displays of a map including a geographic area of interest. In this example, a user is interested in the city of Glendale, Arizona and has appropriately drawn a boundary around the city limit. The upper right of the user interface 20 depicts first 220 and second 230 icons for drawing a boundary around a desired geographic area of interest, such as a circle 220 or a draw tool for a hand-drawn boundary 230 which allows the user to capture a segment with the geographic area of interest. The draw tool can be controlled by a mouse, stylus, or other input device to define a boundary surrounding an area which the user has an interest in identifying and analyzing home exterior features within the area. The draw tool can be controlled by the user to define a rectilinear shape (i.e., polygon), a curvilinear shape, or any combination of rectilinear or curvilinear shapes, that encompass areas of sizes a few square acres to several square miles or more. The draw tool can also allow a user to input an overlay of a variety of geographic shape templates onto the map which the user can manipulate by selecting various points on the outline of the shape and dragging them on the input screen. The draw tool can also allow selection of various points on the map to define a boundary and connect them to define the area. As such, an area of any size and shape can be captured on the input screen by the user. In other implementations, the user inputs the area as a point of geographic coordinates which represents the centre of the geographic area of interest. Other options for choosing a geographic area of interest by entering or selecting from a list localities such as street, block, neighborhood, town, city, county, state, core-based statistical area (CBSA), metropolitan statistical area (MSA), five-digit ZIP Code, nine-digit ZIP Code, geographic coordinates (latitude and longitude), and tax parcel number, while not shown in FIG. 2, can be utilized in the form of data entry fields, check boxes, or pull-downs. When the user defines the geographic area of interest to their satisfaction, the user interface 20 allows the user to lock and select the shape or image for input into a location storage by way of the lowermost icon 240. An example of a selected shape 210 which overlays a portion of a map is shown in FIG. 2. The interface indicates selection of the shape 210 by colorizing the interior of the shape. The geographic area of interest can also be saved once outlined using the lowermost icon 240. At step 3, the boundary drawn by the user is saved into a custom storage system that facilitates geographic calculations. The storage is called Locations Storage 30. At step 4, the saved boundary is extracted from the Locations Storage 30 and applied as a filter in a selection process 40 to identify the addresses of houses that lie within the geographic area.

The process for identifying addresses within a boundary generally operates by saving the boundary in geographic coordinates and converting home addresses to a location on Earth in geographic coordinates as well. The start point for processing home exteriors from an end-user perspective is an area of interest. This could be a ZIP Code, a MSA, a CBSA, an arbitrarily drawn geometry on a map, an entire city, or any other potential region of interest identified in this disclosure. For an illustrative purpose, let us assume that the user is interested in Scottsdale, Arizona. The process starts with establishing a list of all houses (and their addresses/locations) that lie within that city's limits. In order to achieve this, the first step is to create a geometric outline of the area of interest through the user interface shown in FIG. 2. The geometric outline can be achieved through a location aware data format such as Shape files. Shape files facilitate storage, filtering, querying, visualisation, and editing where required. Specifically, geographic querying includes capabilities such as finding if a point exists within a polygon, finding the closest distance from a point to the polygon, finding if a point lies outside the polygon, and so on. This will determine whether a house falls within a specified boundary. Further, for example, other data sources that can be utilized can include a repository that acts as a source of all addresses of houses in the United States that is generated though the cumulative collection home addresses through the review of: (1) deed transactions that are recorded when a house exchanges hands; (2) county assessment records; and, other means provided by independent providers. Some of the fields in the deed data are the house address, configuration (plan size, beds, baths, garages, floors, etc.), and year built. Using a service, it is possible to determine the exact geographic location (in latitude, longitude) on Earth where the house with an address lies. All the addresses are stored in a data source that facilitates geographic querying to reliably determine the address of each home in a desired geographic boundary. Through the steps above, a reliable method of finding all addresses within an area of interest results.

At step 5 of FIG. 1, the addresses of all houses within the geographic area are retrieved from Home Addresses Storage 50, a bespoke storage system that contains addresses, location, and other details of all homes in the United States. This storage facilitates geographic queries, such as finding all houses within a specified distance of a location, all house addresses within a supplied boundary (the functionality executed at step 4), or all houses belonging to a locality such as city or ZIP Code. Optionally, the search can be limited to all houses within the distance or boundary or specific types of houses (e.g., single family, multiple family, townhouse, duplex). At step 6, street view images of houses throughout the United States are captured and stored in Street View Imagery Storage 60. Independent street-image acquisition operators 65 acquire images over various parts of the world. This is an independent and asynchronous activity. Areas where these images are acquired is a matter of decision making internal to their needs, and a user has little control in that decision making. Typically, these images are captured by cameras mounted on cars that traverse through cities. Images are typically acquired using panoramic 360 degrees cameras. There are operators who also acquire these using cameras mounted on the car dash. This camera height and perspective when viewing home exteriors give a clear view of the home exterior that can be used as inputs for a Machine Learning model trained with such street view images with different types of home exterior features labelled. The street view images also have the added advantage of being geotagged, thus making it easier to tie an image of a house to its address. Image operators facilitate requests such as an image capturing a specific location or address and an angle of view. At step 7, for every house address in the user's geographic area of interest, images are procured from Street View Imagery Storage 60 and stored in Façade Images Raw Storage 70. This is an image storage that facilitates quick sort and search of images using metadata such as address, ZIP Code, city, county, and state.

Figure 3:
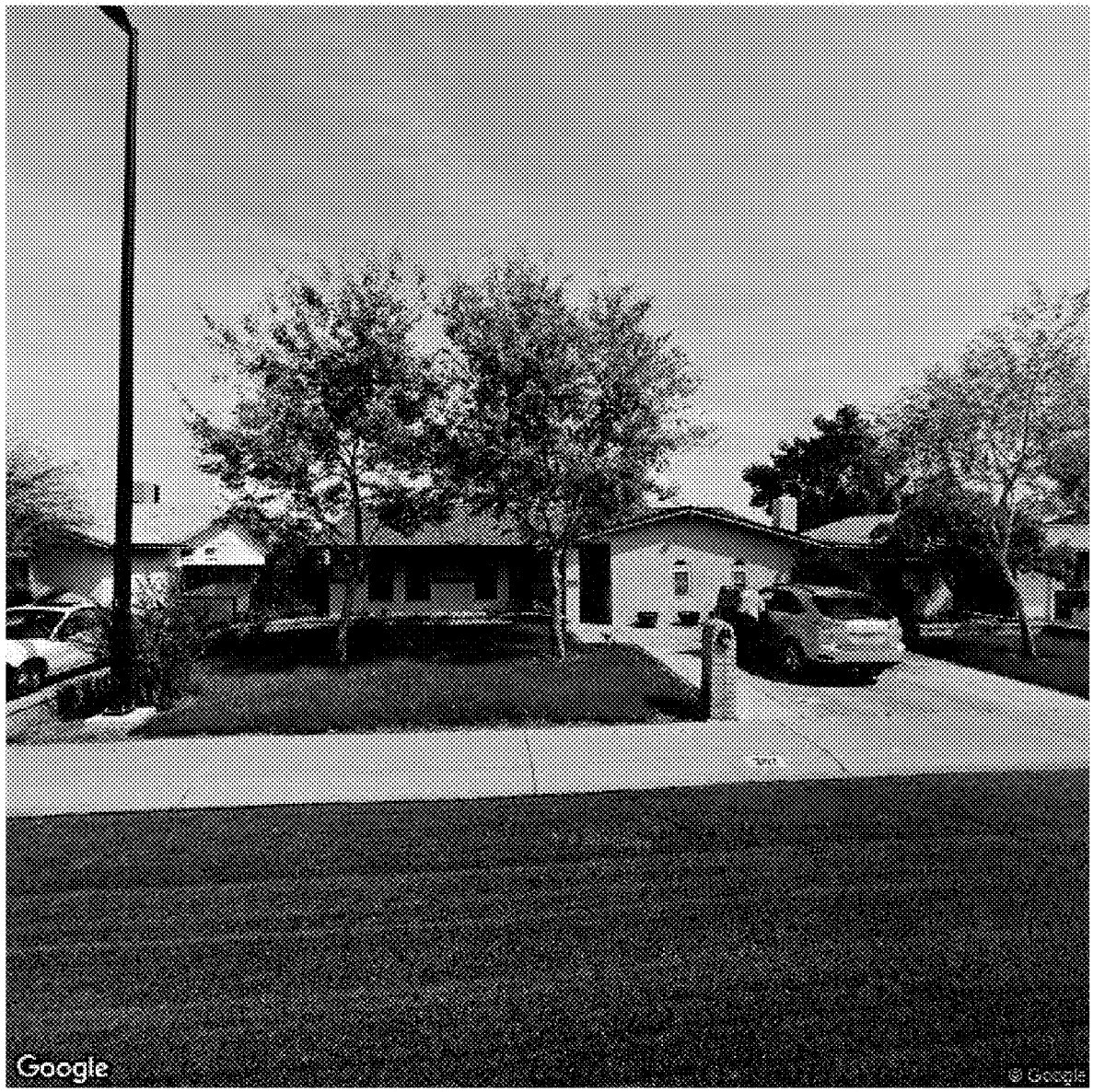
FIG. 3 is a raw street-level image of a home for a particular address according to one example.
Figure 4:
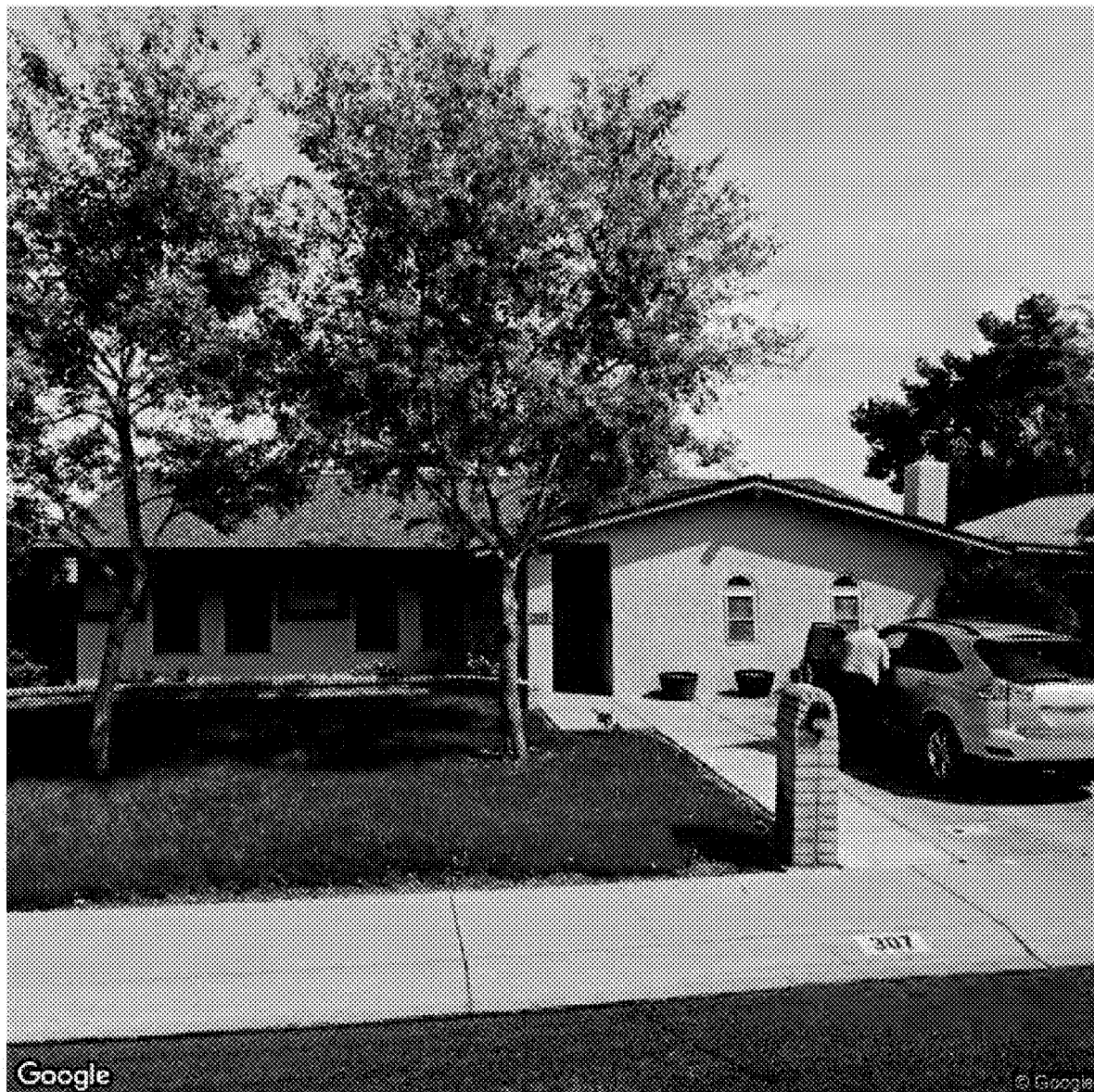
FIG. 4 is the image of FIG. 3 that has been cropped to remove portions of adjacent houses according to one example.
Figure 5:
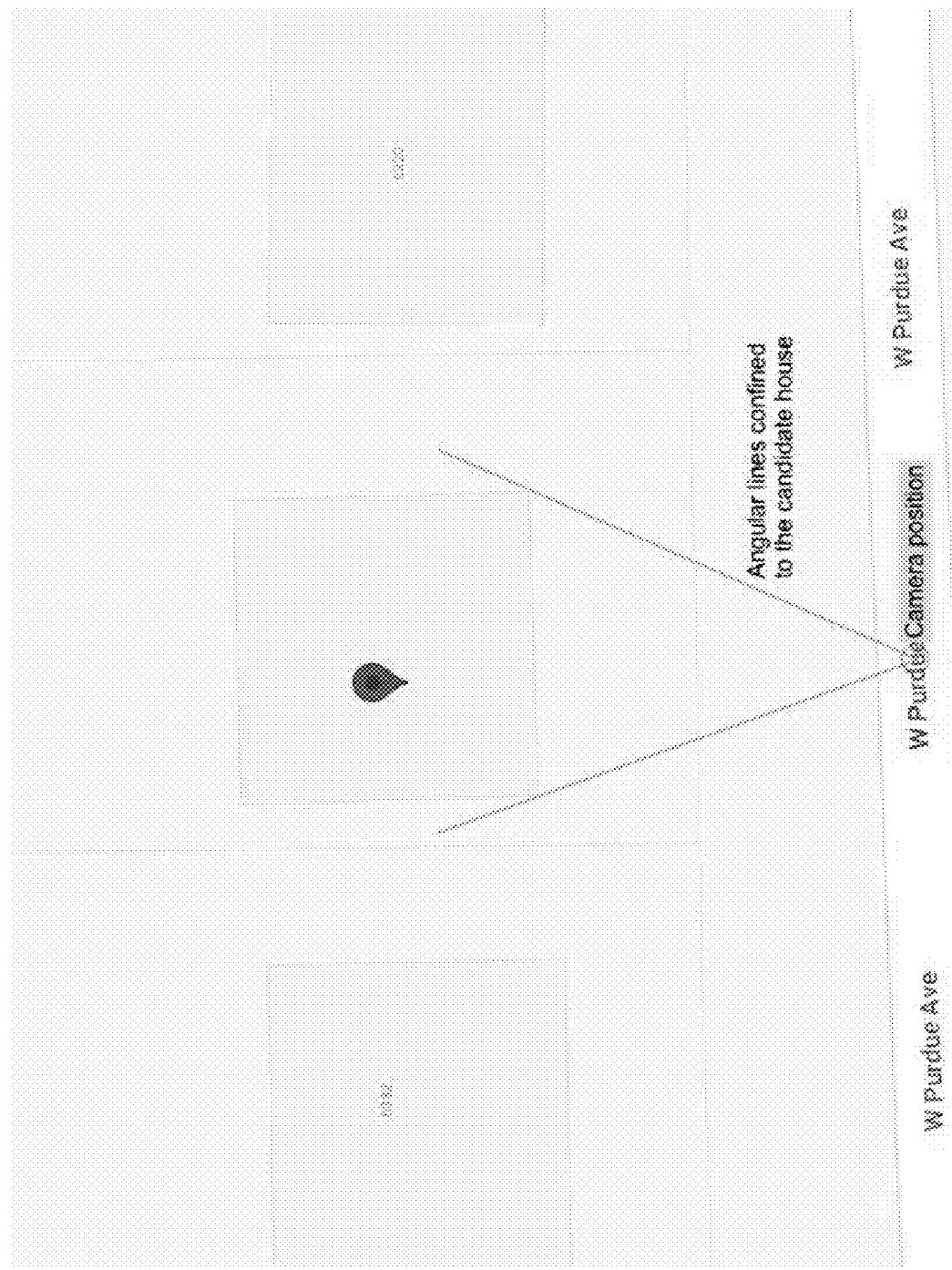
FIG. 5 is an illustration of a method for estimating house extent from a mapping application according to one implementation.

The acquisition of satellite and aerial images from satellite and aerial image operators 85 over various parts of the world and their storage 80 is depicted in step 8 of FIG. 1. The imagery can be obtained through various aerial remote sensing platforms including but not limited to drones, unmanned aerial vehicles (UAVs), High-Altitude Long Endurance (HALE) air vehicles, balloons, aircraft, and satellites with sensors acquiring images over various parts of the world. This is an independent and asynchronous activity. Areas over the globe where images are acquired is a matter of decision making internal to the satellite/aerial operators, but a user does not have a control in that decision making. These satellite or aerial images acquired by the satellite/aerial operators can be stored in databases which can include various national, regional, or state governmental databases, private databases, or academic databases. The satellite imagery may be from satellites acquiring public domain images (e.g., Landsat, Sentinel, MODUS) or those run by private companies (e.g., Airbus). These images are stored in multiple sizes and formats, including, but not limited to: JPEG, JPEG 2000, PNG, TIFF, GeoTIFF, ERDAS Imagine, IDRISI Raster, Envi Raw Raster and can be accessed through different protocols. The images can include monochromatic, panchromatic, multispectral, hyperspectral, binary, grayscale, indexed, infrared, RGB, radar or any combination thereof, and can include those with a high resolution (30 centimeters to 5 meters per pixel) for detecting exterior home features. The images can also be used in conjunction with other sensing modalities such as light detection and ranging (LiDAR) for providing elevation data for detecting the features. The images acquired by the satellite/aerial operators 85 are stored in Satellite Imagery Storage 80 at step 8. The images include information about the image containing details about image coverage, quality, resolution, colours, intensity, as well as geographic location information. This information is textual data called metadata which is organised in a structure that facilitates search and querying. The metadata can be extracted by satellite/aerial operators using advanced image and geographic reference processing FIGS. 3-5 depict a process for image cropping depicted in FIG. 1 as step 9 (also called out at 90). When acquiring images of houses from a third-party provider, it is often a form of feed that is seamless (i.e., multiple homes adjacent to each other). However, a user may be only interested in one house, and as such, there needs to be some way of extracting images of only the house that the user is interested in. If this is not done, it is possible that features from the neighbouring houses could get counted in. For example, in FIG. 3, the raw image from a provider for a given address is shown. If this image were processed as shown, windows, roof, and façades from the neighbouring houses in the images could also be included. What instead is required is just a crop of only the home of interest, as shown in FIG. 4. Trimming the image to fit only the candidate house can be executed by the following process:
  a. For a given address, retrieve the image from a provider.
  b. From satellite imagery and a mapping application, find the angular extent of the house from the nearest point on the street. Translate that to pixel values for the distance and angles. An example is shown in FIG. 5.
  c. Crop the image to acquire only the candidate house by removing pixels exceeding the width of the house through the information acquired in step b.

The cropped image is stored in Façade Cropped Images Storage 100, depicted as step 10 in FIG. 1. This too, is an image storage that facilitates quick sort and search of images using metadata such as address, ZIP Code, city, county, and state. The cropped image is required for processing because an uncropped image would add in features from the adjacent houses, which is undesirable. This image storage facilitates quick sort and search of images by various means. For example, this allows for a search for the cropped image of a house given its address. Another example would be to search for all houses that belong to a ZIP Code. If a user wanted the images of all houses that lie on a particular street in a city, this storage facilitates that search.

At step 11, the cropped images (limited to a single house per image) are processed by the trained Machine Learned Model 110 that extracts and demarcates the features. The Machine Learned Model 110 accepts the cropped image as its input and outputs the measure of the features the user is interested in retrieving, such as a quantified number of specific features or their total area. These include windows, doors, façade type and area, roof type and area, and garage doors. The output can also include other analyses such as the average number or area of specific features per house in the geographic area of interest. The Machine Learned Model 110 can be trained by providing training sets composed of a set of street level or other images of homes that have had various exterior features labelled as input for a Machine Learning Algorithm. The labelled exterior features used to train the Machine Learned Model can include any identifiable structure on the outside of a home, including but not limited to including windows, doors, garage doors, roofs, overhangs, chimneys, sky lights, floors, façades, cladding, flashing, trim, eaves, soffits, fascia, shutters and other window decor, steps, patios, decks, porches (e.g., open, covered, enclosed, screened-in, porticos), stoops, lattices, railings, stairs, columns, retaining walls, balconies, driveways (e.g., asphalt, gravel, concrete), sidewalks, walkways, areaways, covered parking (carports), fences (e.g., chain-linked, wood, wrought iron, vinyl, picket, privacy, split rail) gutters, drain pipes, lights, flag poles, and mail boxes. Materials of façades used to train the model can include stucco, brick, adobe, vinyl, wood, aluminum, steel, stone, faux stone, and composite. The façade materials used for training can be in the form of shingles, shakes, walls, siding, panels, and cladding oriented horizontally or vertically. Materials of roofs used to train the model can include asphalt, metal, wood, clay, coal and tar, concrete, slate, rubber, and composite in the form of shingles, shakes, panels, and tile. Solar panels covering the entirety of the roof or portions of the roof can also be used to train the model, as well as satellite dishes, antennae, and lightning arrestors. The Machine Learned Model can also be trained on shapes of roofs such as gabled, gambrel, A-frame, hip, flat, shed, and mansard. Types of windows used to train the Machine Learned Model include awning, bay, bow, casement, single-hung, double-hung, and picture. Other exterior features that can be used to train the Machine Learned Model include landscaping features (e.g., lawns, trees, shrubs, bushes, flower beds, mulch beds, raised beds, and xeriscaping), infrastructure features such as utility meters, utility service boxes, overhead service conductors, vents/ventilation pipes, wires, other roof penetrations, electrical outlets, spigots, air conditioning units, and security features such as cameras. The model can also be trained with structures outside the home, such as vehicles, campers, sheds, and gazebos. The Machine Learned Model can also be trained with images having one or more exterior features that are in need of repair or replacement. This includes windows, doors, garage doors, roofs, and façades. Each training set includes images with particular exterior features of interest labelled. Images lacking these features can also be included in the training sets to serve as a reference. The images used to train the model can be conventional digital images, or include images limited to specific color spectra or bands of light to facilitate resolution of specific features, the color spectra including monochromatic, panchromatic, multispectral, hyperspectral, binary, grayscale, indexed, infrared, RGB, or any combination thereof. Each type of image has a particular type of sensor data associated with it. Monochromatic, panchromatic, multispectral, hyperspectral refer to the bands of light measured by the sensors. Monochromatic images capture varying intensities of a single colour of the visible spectrum, while panchromatic images collect all of the visible colours and combine them in one channel. Multispectral images are produced by measuring discreet, discontinuous bands and combining them, while hyperspectral images are measured by imaging spectrometers collecting information on a continuous spectrum which can include wavelengths invisible to the human eye. Each pixel of the hyperspectral image contains spectral information. Binary images contain two values: off (0) or on (1). Grayscale Images represent intensities ranging from least intense (black) to most intense (white). Indexed images are represented by color values within a color lookup table. RGB images include data representing color composed of red, green, and blue channels. The image data can also include two dimensions representing the relative location of the pixel in the image. The pixel data can be represented in common data types such as bytes and unsigned integers.

Figure 8:
FIG. 8 is the image of FIG. 7 that includes output of the system and method of home exterior feature detection according to one example.
Figure 9:
FIG. 9 is an image of a home as input for a system and method of home exterior feature detection according to another example.
Figure 10:
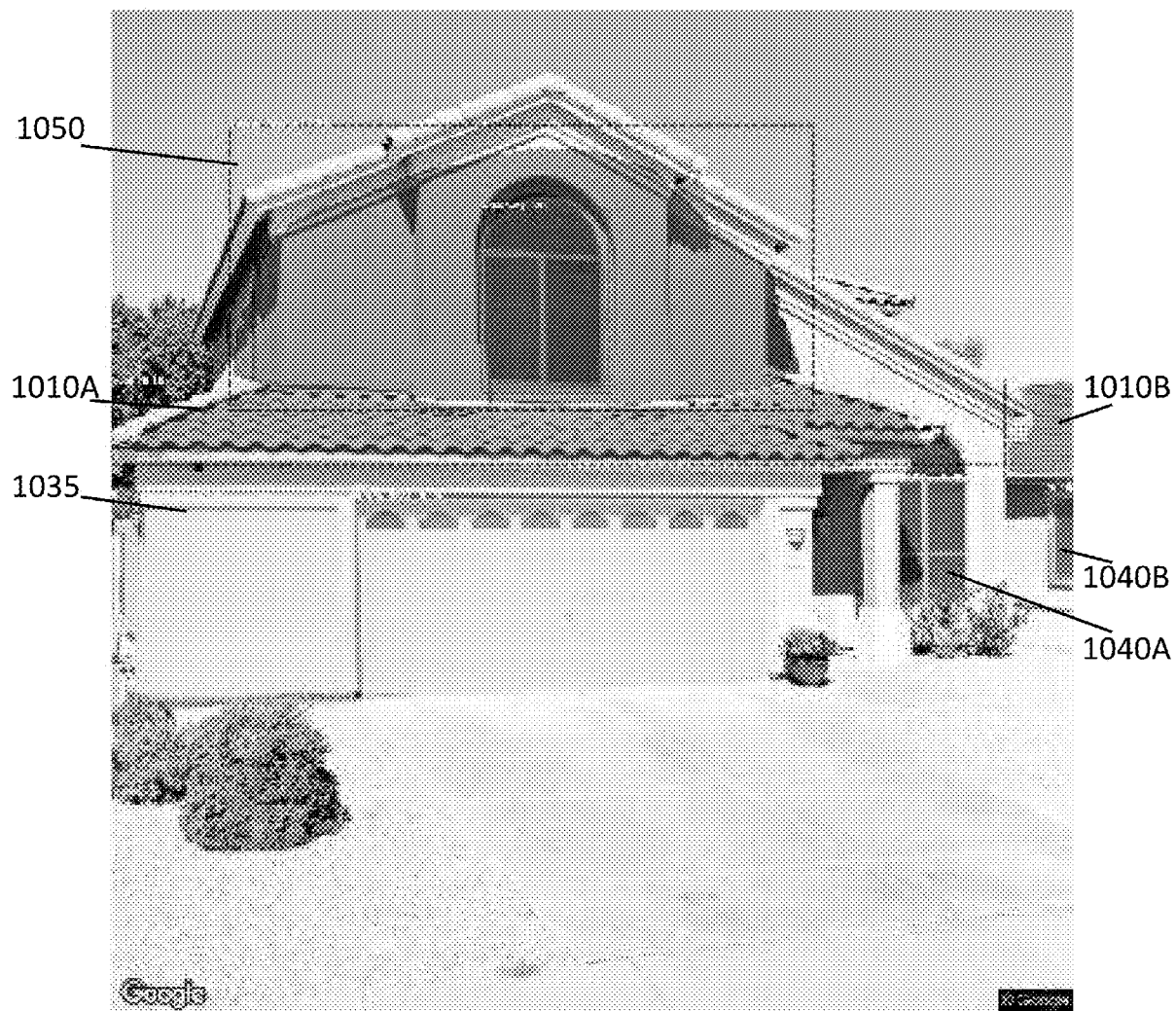
FIG. 10 is the image of FIG. 9 that includes output of the system and method of home exterior feature detection according to one example.

Using Machine Learning algorithms, the model is trained by associating pixel data representing various home exterior features with a classification or label (e.g., door, window, roof, façade, shrubbery, gutter). These features are represented as edges or geometric patterns within the pixel data where contrast with the background of the image occurs. For example, pixel information concerning a window may differ from the background of the image by pattern, dimension, shape, color or intensity, and these differences are captured in the Machine Learned Model to perform the classification. Specific examples of identified exterior features in street level images of houses by way of a Machine Learned Model are shown in FIGS. 8 and 10. Exterior features in need of repair or replacement can be detected through features or irregularities present in an otherwise uniform field of pixels, such as a pattern representing a crack or opening present in a field of pixels surrounded by a boundary representing a window. Other indications of need of repair or replacement include differences in color in a field of pixels representing a façade or roof. Such exterior features can be labelled during the training as broken, in poor condition, and/or in need of repair or replacement. The street level image data can be supplemented with other data, such as LiDAR which measures the elevation of housing features, or overhead images such as satellite or aerial images. The Machine Learned Model then can output a classification or label as a prediction for home exterior features in a new image or set of images that was not seen by the model (i.e., not used to train the model) which includes a probability that the classification is correct. The Machine Learned Model can be based on any Machine Learning algorithm that can create a classifier for images, including Convolutional Neural Networks, as well as statistical models such as, but not limited to Support Vector Machines, Random Forests and Decision Trees, Gradient Boosting Model, Naive Bayes Model and computer vision models such as, but not limited to Histogram of Oriented Gradients model and Hough Transforms.

The address, model outputs and image(s) are then fed to the Mensuration Processor 120 at step 12 of FIG. 1. The logic in this processor converts pixel values and demarcations to terrestrial measurement units and analyzes the home exterior features. For examples, counts of windows, doors, garage doors are aggregated and areas of roof, façades are calculated. The processor utilizes the output of step 11, which include data counts of doors, windows, and garage doors, and type and area of façade, windows, and roofs. While counts are just numerical information and can be used as is, the same cannot be said for the area. Areas calculated by the neural network are in values of pixels. These are converted to terrestrial measurement units such as square feet or meters by the Mensuration Processor 120.

Figure 6:
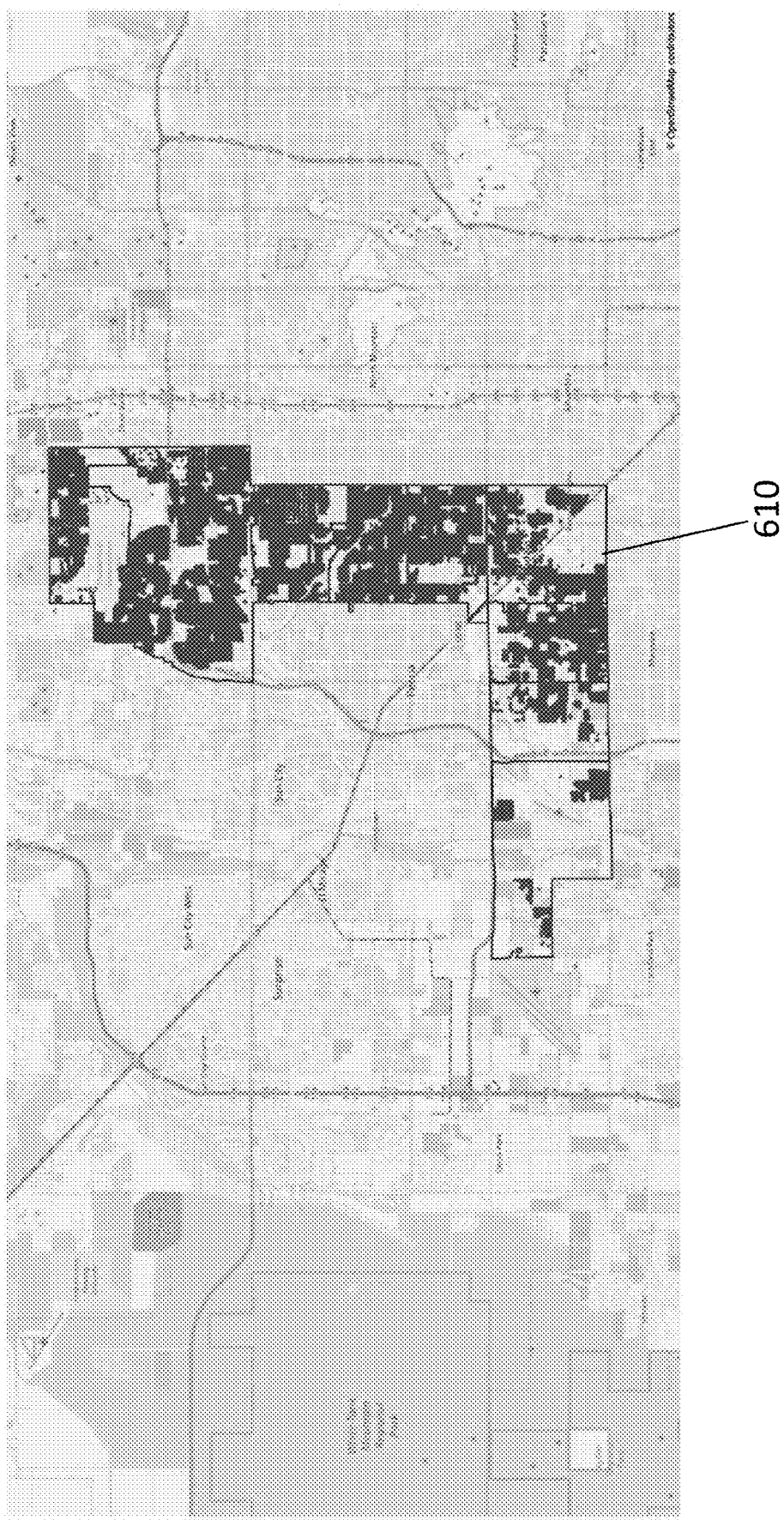
FIG. 6 is a screenshot of a user interface showing aggregated output of home exterior feature detection and analysis visualized for an input boundary according to one implementation.
Figure 7:
FIG. 7 is an image of a home as input for a system and method of home exterior feature detection according to one example.

At step 13, the processed data and insights are delivered 130 back to the user who initiated the request. This is also additionally analyzed for statistical inferencing. Using this data processing, analytics such as region and feature level conclusions can be derived. Examples of output and statistical inferencing derived from such processing are shown in FIGS. 6-15. Specifically, FIG. 6 depicts a screen shot of an aggregated output visualized for a particular input boundary 610 chosen on a map by the user. The output depicts by way of the map the location of any home exterior feature identified by way of the Machine Learned Model, with blue areas showing the geographic presence of identified features. FIGS. 7-10 show images of homes including home input images (FIGS. 7, 9) and their corresponding output images (FIGS. 8, 10) after the input is provided to a Machine Learned Model of the disclosure. Home exterior features identified for the output image of FIG. 8 by way of the Machine Learned Model include roof 810 (colored in the output image in pink), garage interior 820A (light green), garage exterior or opening 820B (dark green), door 830 (red), windows 840A and 840B (orange), and façade 850A and 850B (blue), and for FIG. 10 include roof 1010A and 1010B (pink), garage door 1035 (yellow), windows 1040A and 1040B (orange), and façade 1050 (blue). Each feature in FIGS. 8 and 10 is surrounded by a dashed line of the same color representing a region of the image where the feature has been identified. While not shown in FIGS. 8 and 10, a probability that each identified feature is correct can also be included (e.g., 85%, 0.85). As shown in FIG. 8, the Machine Learned Model can identify exterior features of any shape, such as the rectangular door 830, the triangular roof 810, and the irregular shape of the façade 850B. FIGS. 8 and 10 also show the sensitivity of the Machine Learned Model for detecting exterior features in images, as small portions of exterior features of neighboring homes, such window 840A in FIG. 8 and roof 1010B and window 1040B in FIG. 10 were accurately identified by the model.

Figure 11A:
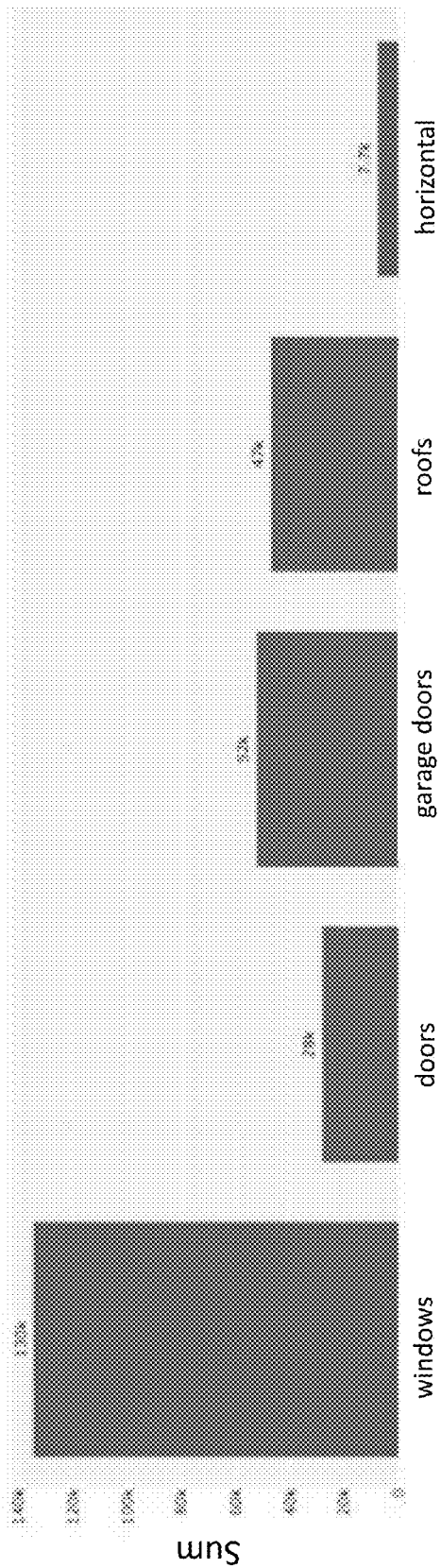
FIGS. 11A and 11B are bar charts showing the total sum of all features identified for an input geographic area according to one example.
Figure 11B:
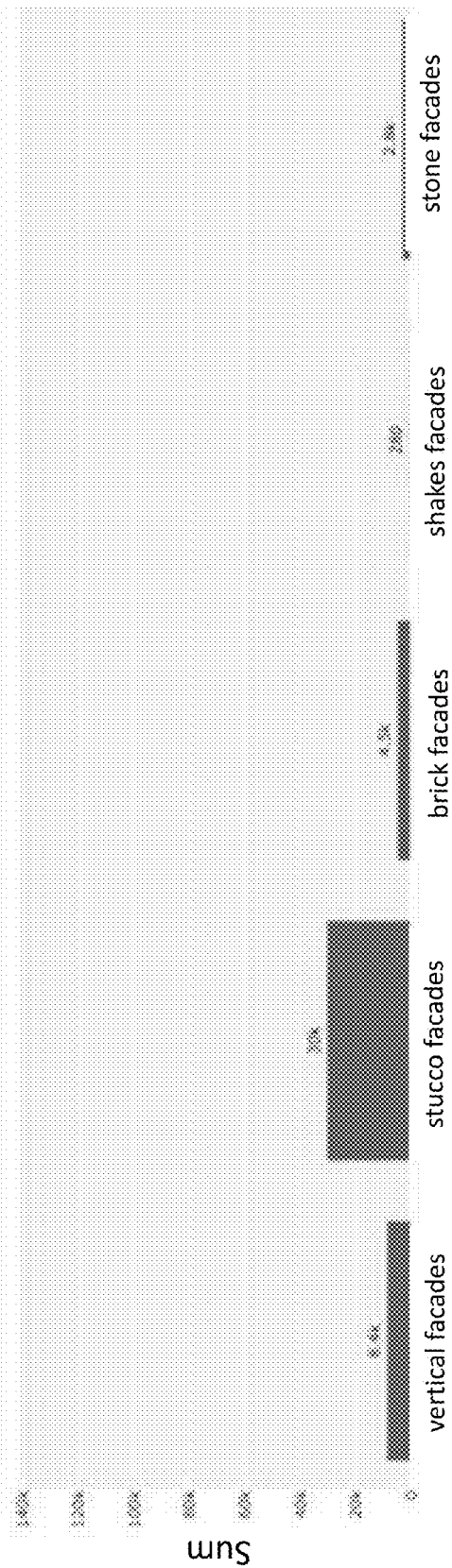
Figure 12:
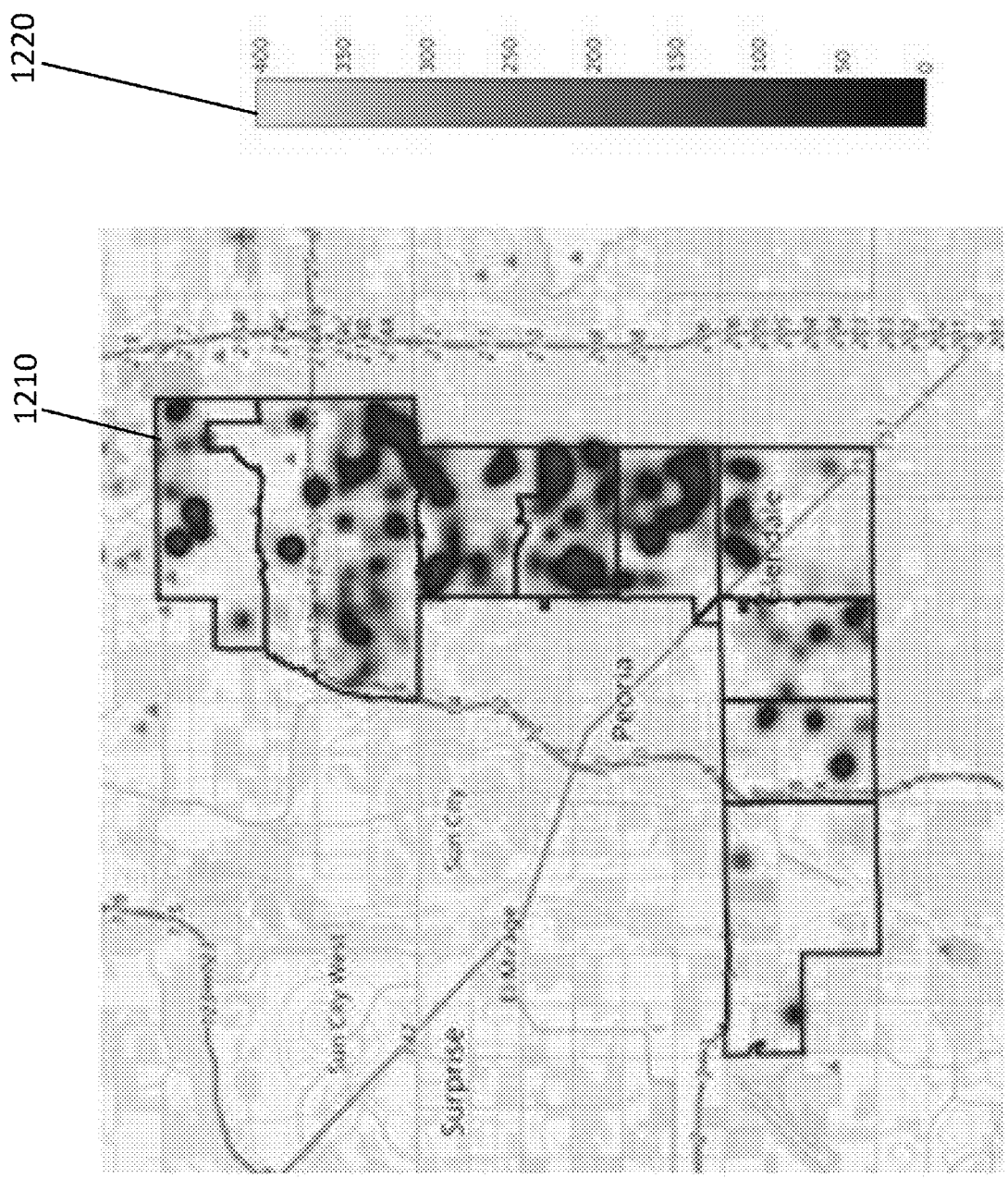
FIG. 12 is a heatmap showing counts of brick façade for a geographic area of interest according to one example.
Figure 13:
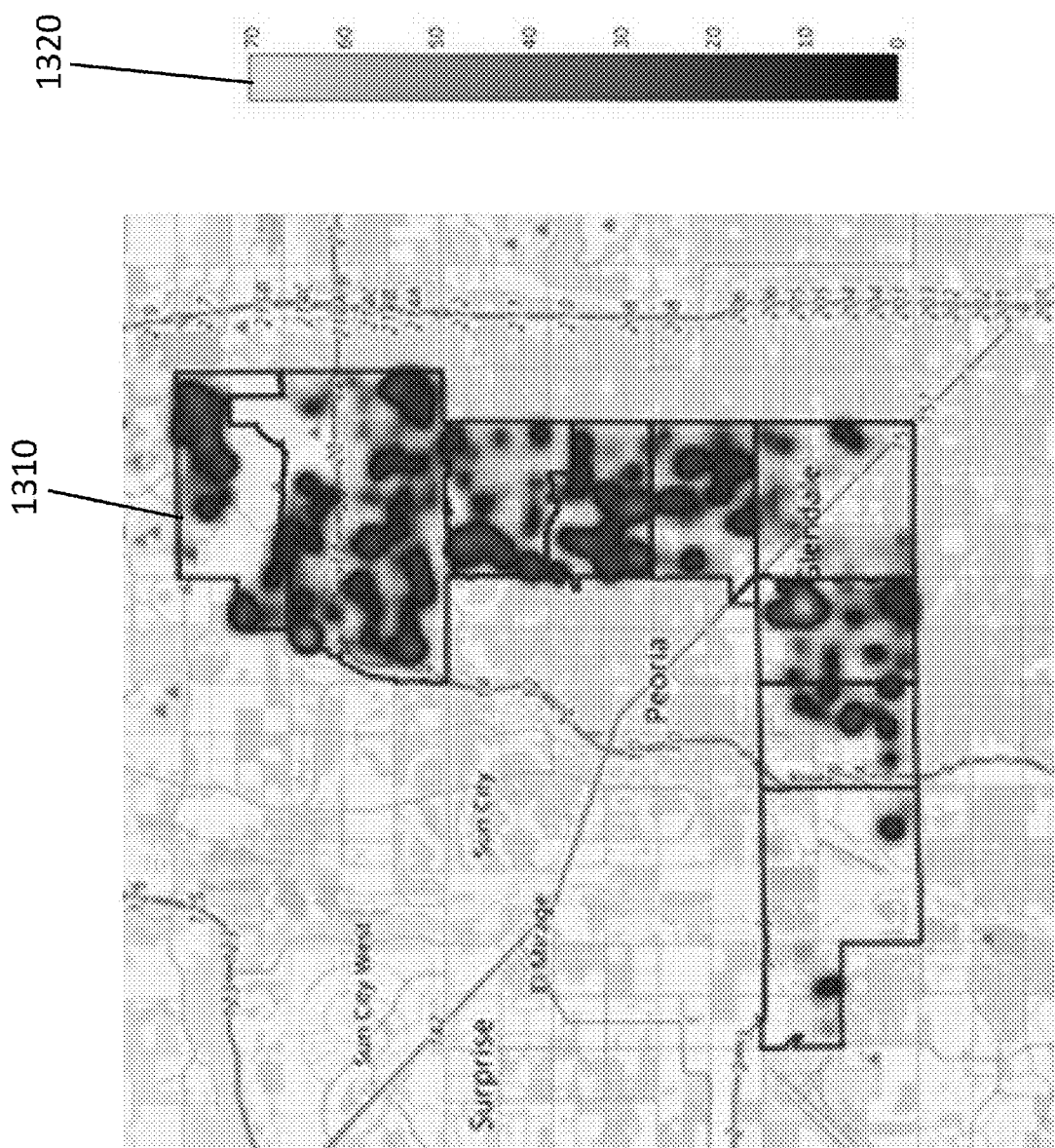
FIG. 13 is a heatmap showing counts of stone façade for a geographic area of interest according to one example.
Figure 14:
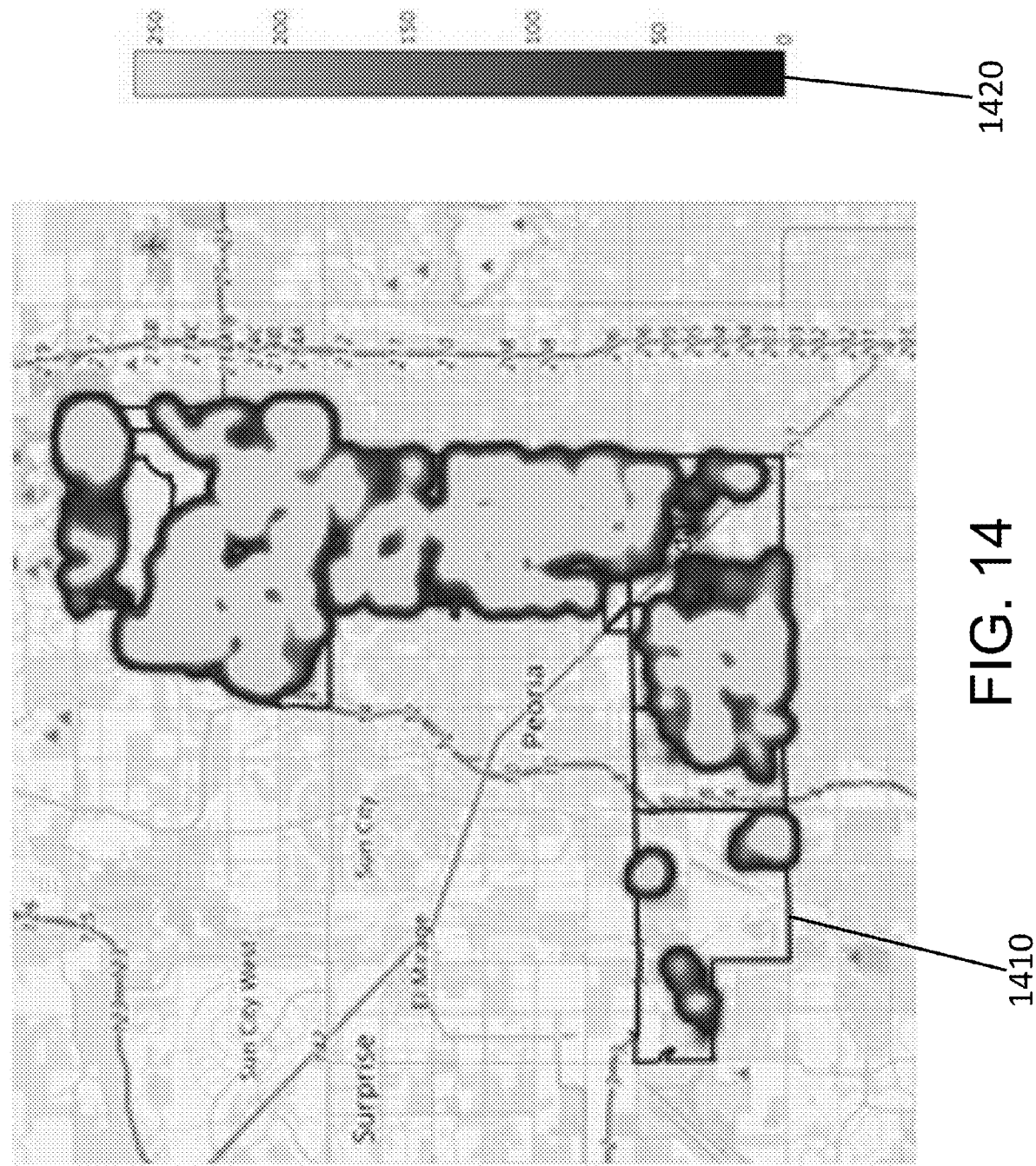
FIG. 14 is a heatmap showing counts of garage doors for a geographic area of interest according to one example.
Figure 15:
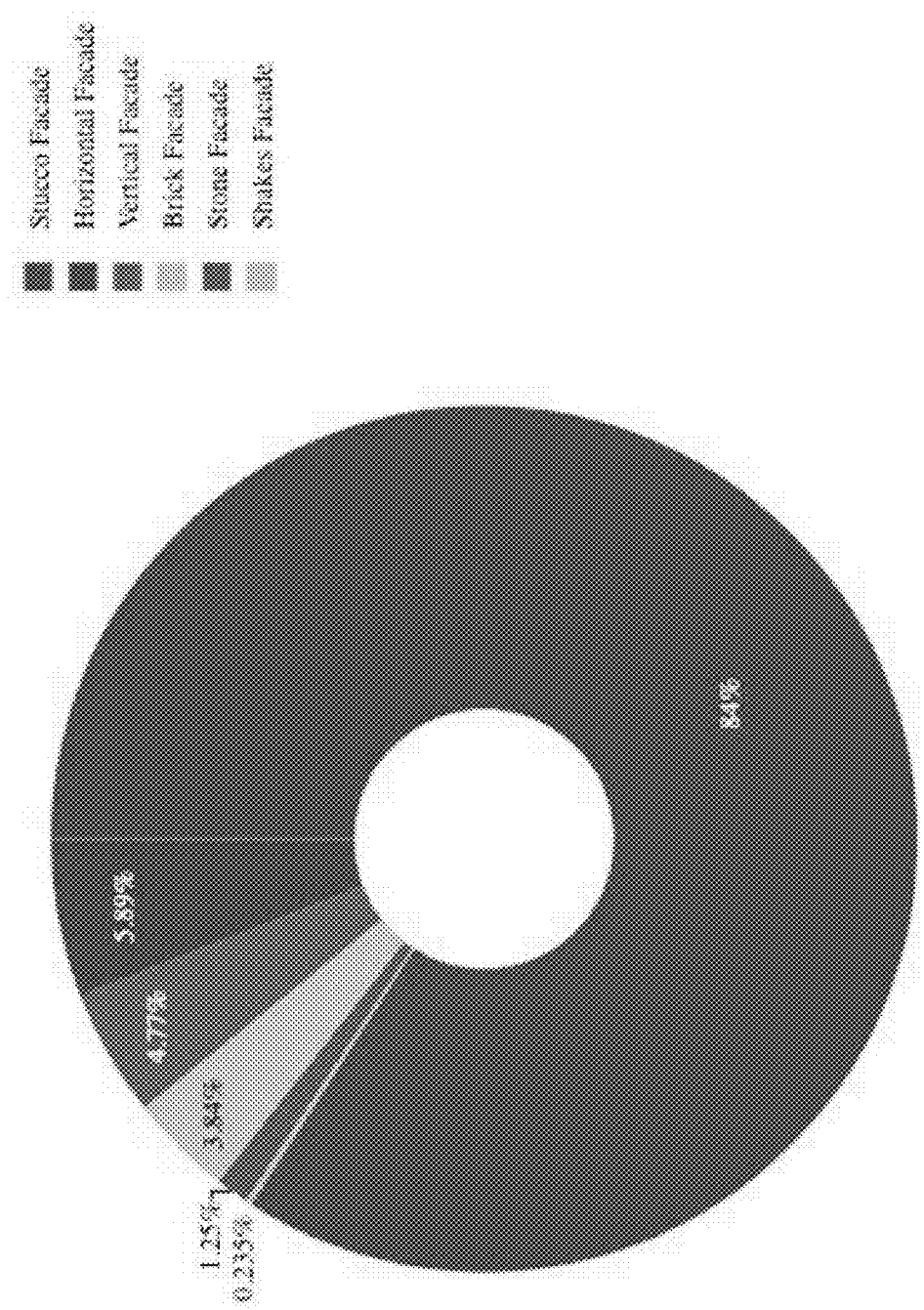
FIG. 15 is a pie chart showing façade features by area according to one example.

FIGS. 11A and 11B are bar charts showing the total counts of the number of different home exterior features within a geographic area chosen by a user, including windows (130, 000, or 130*k*), doors (28*k*), garage doors (52*k*), roofs (47*k*), horizontal façades (7.7*k*), vertical façades (8.4*k*), stucco façades (30*k*), brick façades (4.5*k*), shakes façades (280), and stone façades (2.8*k*). In other implementations, the analysis is refined to hone in on specific features, such as windows and doors, or one particular type of façade. Other implementations of the bar charts can show total areas of specific features for a chosen geographic area. FIGS. 12-14 depict counts for particular home exterior features in the form of heat maps, such as brick façades (FIG. 12), stone façades (FIG. 13), and garage doors (FIG. 14) for a specific inputted geographic area 1210, 1310, and 1410, with the color legend called out at 1220, 1320, and 1420. The legend 1220, 1320, 1420 represents a vertically displayed spectrum of colors with darker colors such as blue and purple at the bottom representing lower counts and brighter colors such as orange and yellow at the top indicating higher counts of each individual feature. As shown, the area of the geographic areas of interest occupied by the specific features is lowest in FIG. 12 for brick façades and highest in FIG. 14 for garage doors, with FIG. 13 representing stone façades falling somewhere in between. It can also be observed that specific features tend to distribute in multiple pockets within the geographic area of interest 1210, 1310, 1410, likely representing the effect of a single builder in various neighborhoods. Such visual identification of neighborhoods having an abundance of particular types of exterior features facilitates targeted marketing campaigns for home improvements or remodels. The sheer number of garage doors in the geographic area 1410 in FIG. 14 exceeds those of the façades shown in FIGS. 12 and 13, as indicated by the brighter colors in the heat map. FIGS. 12-14 represent examples of heat map output; other implementations utilizing any combination of the home exterior features mentioned in this disclosure in such heat map analysis, or using other measures such as area instead of counts, are contemplated. FIG. 15 shows a pie chart depicting the relative geometric areas of façades captured in the geographic area of interest as percentages of total area of captured façades, including stucco façades, horizontal façades, vertical façades, brick façades, stone façades, and shakes façades. Other implementations of such pie chart analysis of total areas directed to any set of multiple home exterior features mentioned in the disclosure, in any combination, are also contemplated, including quantifying and analyzing areas of roofs, doors, windows, garage doors, and so on. The pie chart analysis can also be implemented to represent the relative number of features captured in a geographic area of interest as percentages of a total, instead of areas as percentages.

FIG. 16 shows an example of the output data at step 13 of FIG. 1 produced in a standardised format for consumption by various geographic information system programs. Starting at the top, the output data includes a unique alphanumeric identifier, street address, geographic location, date of image acquisition, image URL, mask image URL, counts of individual home exterior features identified in the image, and calculated areas of individual home exterior features of the image. The data shown can be accumulated from other images representing a geographic area of interest, processed, stored, and analyzed for cumulative analytics such as home exterior feature counts and area quantification.

Figure 17:
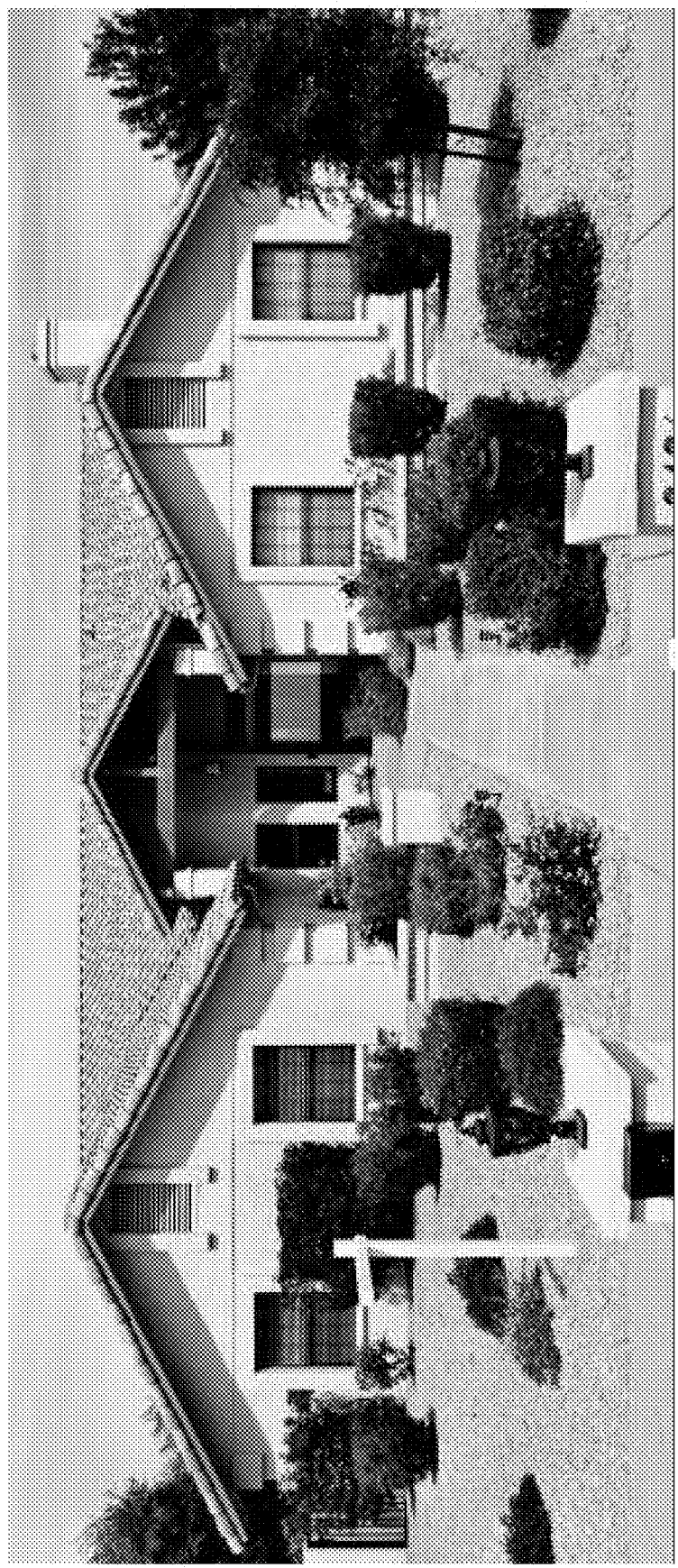
FIG. 17 is an image taken from street level showing a front perspective view of a home according to one example.
Figure 18:
FIG. 18 is an image taken from street level showing a left side perspective view of the home of FIG. 17 according to one example.

The above examples demonstrate identification of features from the front exterior of a house; the motivation in doing this is to gather information about the most intricate detail of information of the house exterior, which is usually the front. However, to get a more comprehensive information about the house, the same pipeline can be automated to process other perspectives of the same house. As such, the disclosure provides for utilizing a combination of perspectives of the exterior house, including front, sides, back, and overhead views. For example, FIGS. 17 and 18 show two perspectives of a house. FIG. 17 is regularly processed, and FIG. 18 is an additional perspective of the same house from the side that can be processed in the same pipeline. It is safe to extrapolate the opposing, unseen side using the side observed in FIG. 18 because house exteriors are usually symmetrical. There are distinct advantages to processing other perspectives of a house exterior. For example, additional counts of garages, windows and doors can be determined. A better assessment of the house exteriors in conjunction with the front perspective is also provided, as well as an unbiased, comprehensive feature and conditional assessment of a house.

While the above examples illustrate the utilization of the systems and methods in the United States, other implementations applicable to other geographic areas, such as Canada, Mexico, Central America, South America, Europe, Asia, Australia, and Africa which utilize imagery services that cover these areas, are also contemplated.

As can be appreciated by those in the computer engineering arts, inputting steps depicted in the figures, such as capturing a geographic area to choose a set of homes within the area for identifying and analyzing exterior features can be performed through one or more input-output (I/O) interface on a fixed position computer such as a desktop computer or server or on a portable computer/computing device, such as a tablet, laptop, PDA, or smartphone. Visual prompting can take the form of a message and/or input field provided to the user on a display. The input field can be provided as part of a graphical user interface provided on the display of a computer or computing device which provides one or more icons, data entry fields, check boxes, or pull-downs which allow the user to input a geographic area and associated data. A choice of icons can allow a geographic area to be drawn on a map such as through movement of a mouse, stylus, or other input device, or in addition or alternatively, data such as street, block, neighborhood, town, city, county, ZIP Code, ZIP+4 Code, metropolitan statistical area (MSA), core-based statistical area (CBSA), or tax parcel number can be chosen or entered using the other input graphics mentioned above. Auditory prompting can take the form of speech or a recording broadcast from a speaker which prompts the user to enter the location. Inputting steps can be performed through traditional inputting means such as a physical keyboard or a keyboard projected on a display, such as a touchscreen. The keyboard can be a QWERTY keyboard or a condensed keyboard commonly used in electronic devices such as cell phones. Inputting can also be performed through the user providing speech which is inputted through a microphone of the computer or computing device and recognized by speech recognition algorithms programmed on the computer or computing device. Outputting steps can be formed through a visual output device such as a display on the computer or computing device.

Computer-executable code or instructions for performing the process steps (such as those shown in FIG. 1) can be implemented as software or an application capable of being run on the computer(s) or computing device(s). The computer-executable code or instructions can be installed on the computer or computing device during manufacture as software, or implemented as firmware or hardware (e.g., circuitry), or some combination of these. The computer-executable code or instructions can be configured to be downloadable onto the memory of the computer or computing device from a cloud storage source available on the internet, such as an application retail source (e.g., "app store") capable of being accessed from a mobile phone, tablet, desktop computer, or other programmable device having components or features capable of performing the method steps described above. Examples of suitable internet-accessible sources include the Apple Store, Google Play, and other sites that make software applications and other downloads available for purchase or license. The computer-executable code or instructions can also be hosted on a server or servers accessible to users through a network connection, or can be distributed between a server and an application installed on a user's device.

The computer-readable code, computer-readable instructions, computer-executable instructions, or "software" can be organized into routines, subroutines, procedures, objects, methods, functions, or any other organization of computer-executable instructions that is known or becomes known to a skilled artisan in light of this disclosure, and can be programmed in any suitable programming language, including PHP, HTML, JavaScript, C, C#, C++, Java, Python, Perl, Ruby, Swift, Visual Basic, and Objective C. By such programming, the computer-readable code, computer-readable instructions, computer-executable instructions, or "software" instruct one or more processors of the computer(s) or computing device(s) to carry out the operations and commands of the application. Inputted locations, geographic areas of interest, and/or the computer-executable instructions can be stored in the computer(s) or computing device(s)'s memory. The memory can be implemented through non-transitory computer-readable storage media such as RAM. As used in the context of this specification, a "non-transitory computer-readable storage medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM; any such storage media storing the computer-executable instructions are included herein.

In one implementation, a computer system for performing the process of FIG. 1 includes 1) one or more computer that is located remotely from a user 10 and connected to the internet and to each other and 2) a computer or computing device accessible to the user 10 that can communicate with the remote computer(s) through a network. The remote computer(s) can be a fixed position computer, and the user's computer or computing device can be fixed such as a desktop computer or mobile/portable. The user's computer or device can be a desktop computer, tablet, or smartphone that can access the user interface 20 of FIG. 1. The user interface 20 can be downloaded as an application from cloud storage services providing retail application downloading to the user's computer or computing device, or can be hosted on a remote computer which acts as a web server and accessed through the internet through an internet browser on the user's computer or computing device. The remote computer(s) can receive geographical location or area information inputted by the user through the user interface (either provided as the application on the user's computer or device, or accessed through the web server) and can have a memory or memories capable of housing storages of FIG. 1 such as Locations Storage 30, Home Addresses Storage 50, Street View Imagery Storage 60, Façade Images Raw Storage 70, Satellite Imagery Storage 80, and Façade Cropped Images Storage 100. The various storages can be implemented in relational databases (e.g., Oracle, SQL Server) stored in memory of one or more computers that communicate by way of a database server or servers with the user's computer or computing device(s) or other remote computer(s). The memory can also house one or more Machine Learned Models 110 used to identify and analyze street level and other images such as cropped images. Mensuration Processing 120 can be hosted on the remote computer(s) and performed through their processors. The storages can be relational databases stored in memory that communicate by way of a database server or servers with the user's computer or computing device or other remote computers. The remote computer(s) can include a set of computer-executable instructions stored in memory which can be used to perform predictions by the Machine Learned Models. The remote computer(s) can then communicate to the user's computer or computing device the results of such predictions 130 as well as notifications. In some implementations, one or more additional steps or functions in the process of FIG. 1 are performed on the user's computer or computing device instead of remotely. In other implementations, the entire set of steps performed outside of the Street View Provider Services 65 and Satellite Imagery Provider Services 85 are performed on the user's computer or computing device. The process need not limited to one particular distribution of functions between those hosted on the user's computer or computer device and those hosted remotely; multiple configurations hosted on one or more computers are contemplated.

Additional embodiments include a computer, computing device, or system or combination thereof capable of carrying out the process and its implementations. The computer, computing device, system or combination thereof can include one or more processors capable of executing the computer-readable code, computer-readable instructions, computer-executable instructions, or "software", one or more interface capable of providing input or output, one or more databases and a set of instructions (e.g., software) stored in a memory of the computer, computing device, or system or combination thereof for carrying out the process. The computer, computing device, or system or combination thereof can include one or more stand-alone computer, such as a desktop computer, a portable computer, such as a tablet, laptop, PDA, or smartphone, or a set of computers or devices connected through a network including a client-server configuration and one or more database servers. The network can use any suitable network protocol, including IP, UDP, or ICMP, and may be any suitable wired or wireless network including any local area network, wide area network, Internet network, telecommunications network, Wi-Fi enabled network, or Bluetooth enabled network. In this way, one or more steps of the process can be distributed across the system or combination, or performed on only one computer or computing device, according to specific applications or designs.

Computers, computing devices, or systems thereof described herein can include a variety of components known in the art, including one or more processor, a volatile memory, a non-volatile memory, standard I/O interfaces such as a universal serial bus (USB) port, an HDMI or HDMI ARC port, an optical port, an ethernet port, and/or a serial port, a hard drive, a disk drive, a CD-ROM drive, a motherboard, a printed circuit board (PCB), circuitry for enabling a wireless connection or communication to another device, such as a BLUETOOTH® board, a Wi-Fi board, or a transmitter-receiver for mobile telecommunications, a data bus, an address bus, a control bus, and/or one or more user interface devices including a display, keyboard, keypad, trackpad, mouse, control panel, touch screen display, speaker, camera, and/or microphone. The computers, computing devices, or systems thereof can be equipped with an operating system implemented as software or firmware. As can be appreciated, the computers, computing devices, or systems may differ in their inclusion, exclusion, or configuration of components according to their individual applications or designs.

The systems and methods of the disclosure can be used for generating leads in the Building Products Manufacturers (BPM) industry and related home service businesses such as home repair and home improvement and remodelling, as well as other services such as landscaping and utility services. For example, consider a remodelling business wanting to identify lead opportunities in a market. The business provides services in the areas of repainting of home exteriors, façade & roof repairs, roof repairs and garage door remodelling. Generating market leads for a business as this would be time consuming through visual/human surveys or expensive. For example, if a business wanted leads for roof repairs, they either must dispatch advertisement flyers to every house in the area or send a human to survey the area so that targeted advertising can occur. These approaches are expensive because they involve human labour. They are also subject to the vagaries of weather. Instead, the system and method of the disclosure can generate leads for the business with minimal human effort to the business and provide for targeted marketing and sales efforts. For example, say Acme Corp undertakes roof repairs in the state of Florida and requires information about roof status in the state for three cities (Miami, Tampa, Orlando). They are particularly interested in roof types, roof size, condition of roof and their distribution based on size. The system and method can obtain images of all houses in these cities, process them, and store the required output information, ready for use by Acme Corp.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method, comprising:
providing a street address and an aerial outline of a house from a mapping application;
converting the street address to a geographic location comprising a latitude and longitude;
retrieving a street level image of the house from the geographic location;
cropping the street level image of the house by way of the following algorithm:
determining a pair of lines each extending from a street level camera position to either corner of a front face of the house and a distance between the corners representing a width of the house from the aerial outline of the house from the mapping application; and
translating the distance between the corners from the determining step to pixel values in the street level image representing the width of the house;
calculating portions of the street level image in excess of pixel values representing the width of the house; and
cropping the portions from the street level image, thereby removing at least a portion of neighboring houses from the image; and
storing the cropped images.

2. The method of claim 1, wherein the street address was retrieved within a geographical area of interest from a storage of street addresses, the geographical area of interest inputted on a graphical user interface.

3. The method of claim 1, further comprising:
providing the stored cropped images to a Machine Learned Model trained with a training set of street level images of houses with one or more exterior features labeled; and
identifying home exterior features of interest in the cropped images by way of the Machine Learned Model.

4. The method of claim 3, further comprising:
processing output of the Machine Learned Model by converting pixels of the identified exterior features into area dimensions; and
quantifying two-dimensional areas of the exterior features in one or more of the cropped images.

5. The method of claim 3, further comprising quantifying a number of identified exterior features in one or more of the cropped images.

6. A method comprising:
receiving output from a Machine Learned Model trained to identify exterior features from houses in street level images in a geographic area of interest, the output comprising one or more exterior features identified;
determining how many distance measurement units correspond to each pixel in the street level images by:
determining distance measurement units corresponding to a width of each house from an aerial outline of each house from a mapping application;
determining a number of pixels corresponding to the width of each house in each street level image;
dividing the distance measurement units corresponding to the width of each house by the number of pixels corresponding to the width of each house to derive distance measurement units per pixel;
determining distance measurements for the exterior features based on the distance measurement units per pixel and a number of pixels corresponding to the exterior features;
determining an area of the exterior features from the distance measurements for the exterior features; and
quantifying the number of exterior features identified.

7. The method of claim 6, further comprising formatting and standardizing the processed output for input into a geographic information system application.

8. The method of claim 6, wherein the output is text having information comprising:
   a unique alphanumeric identifier;
   street address;
   geographic location;
   date of image acquisition; and
   image URL.

9. The method of claim 6, wherein the output comprises counts of individual home exterior features identified.

10. The method of claim 6, wherein the output comprises calculated areas of individual home exterior features.

11. The method of claim 6, wherein the Machine Learned Model is trained with a training set of street level images of houses with one or more exterior features labeled.

12. The method of claim 11, wherein the Machine Learned Model is provided with cropped street level images of houses as input and identifies home exterior features of interest in the cropped images.

13. The method of claim 12, wherein the street level images are cropped by way of the algorithm of claim 1.

14. The method of claim 13, wherein the street level images were retrieved as raw street level images corresponding to addresses with a geographic area of interest, the geographic area of interest received as input with home exterior features of interest on a graphical user interface.

15. The method of claim 14, wherein the addresses of all houses within the geographic area of interest were retrieved after input of the geographic area of interest on the graphical user interface.

\* \* \* \* \*